(12) United States Patent
Ooki et al.

(10) Patent No.: US 6,724,185 B2
(45) Date of Patent: Apr. 20, 2004

(54) SENSOR FOR DETECTING ROTATION ANGLE WITH PERMANENT MAGNETS AND FLUX DENSITY DETECTOR

(75) Inventors: Norikazu Ooki, Tokyo (JP); Katsumichi Sugihara, Tokyo (JP); Hideo Maehara, Tokyo (JP)

(73) Assignee: Kayaba Industry Co., Ltd., Tokyo (JP)

( * ) Notice: Subject to any disclaimer, the term of this patent is extended or adjusted under 35 U.S.C. 154(b) by 0 days.

(21) Appl. No.: 10/048,844

(22) PCT Filed: Jul. 12, 2001

(86) PCT No.: PCT/JP01/06043
§ 371 (c)(1),
(2), (4) Date: Feb. 6, 2002

(87) PCT Pub. No.: WO02/04896
PCT Pub. Date: Jan. 17, 2002

(65) Prior Publication Data
US 2002/0121894 A1 Sep. 5, 2002

(30) Foreign Application Priority Data
Jul. 12, 2000 (JP) .......................................... 2000-211484

(51) Int. Cl.⁷ ................................................. G01B 7/30
(52) U.S. Cl. ................................ 324/207.2; 324/207.25
(58) Field of Search ......................... 324/207.2, 207.21, 324/207.24, 207.25; 338/32 R, 32 H

(56) References Cited

U.S. PATENT DOCUMENTS

| 5,850,142 A | * 12/1998 | Rountos et al. .......... 324/207.2 |
| 6,215,299 B1 | * 4/2001 | Reynolds et al. ........ 324/207.2 |
| 6,489,761 B1 | * 12/2002 | Schroeder et al. ..... 324/207.25 |

FOREIGN PATENT DOCUMENTS

| JP | 05-126512 A | 5/1993 |
| JP | 08-005312 A | 1/1996 |
| JP | 10-132506 A | 5/1998 |

\* cited by examiner

*Primary Examiner*—Jay Patidar
(74) *Attorney, Agent, or Firm*—Rabin & Berdo, P.C.

(57) ABSTRACT

A rotation angle sensor comprises permanent magnets 4, 5 having opposite poles facing each other, and a flux density detecting unit 10 which performs relative rotation between the permanent magnets 4, 5. Opposite magnetic pole surfaces 11, 12 of the permanent magnets 4, 5 are formed in a curved shape so that the flux density between the permanent magnets 4, 5 can be suitably distributed. In this way, the resolution of the sensor can be increased without increase in cost.

7 Claims, 5 Drawing Sheets

DISPLACEMENT

SENSOR FOR DETECTING ROTATION ANGLE WITH PERMANENT MAGNETS AND FLUX DENSITY DETECTOR

FIELD OF THE INVENTION

This invention relates to a rotation angle sensor which uses permanent magnets which output a physical rotation angle as an electrical signal.

BACKGROUND OF THE INVENTION

In the prior art, this type of rotation angle sensor comprises permanent magnets 4, 5 which rotate together about a rotation centreline (centerline) A, and a flux density detecting unit 10 which remains stationary relative to these magnets as shown in FIG. 8. In the permanent magnets 4, 5, unlike poles are arranged opposite each other, and are disposed symmetrically with respect to the rotation centreline A. The flux density detecting unit 10 is interposed between the permanent magnets 4, 5.

The flux density detecting unit 10 may for example be a hall (Hall) element which outputs a voltage according to the flux density which varies according to the relative rotation of the permanent magnets 4, 5.

In this type of prior art rotation angle sensor, the cross-sectional shape of the permanent magnets 4, 5 is square and opposite faces thereof are parallel, so the flux density distributed between the permanent magnets 4, 5 increases towards a magnet centreline B, as shown in FIG. 5. The output variation of the flux density detecting unit 10 depends not only on the variation amount of the flux input angle, but also on the relative positions of the permanent magnets 4, 5, i.e., on the offset amount from the magnet centreline B. Therefore, the output characteristics of the flux density detecting unit 10 are not linear but nonlinear relative to the displacement, as shown in FIG. 9, and this leads to a detection error.

It is therefore an object of this invention to provide a rotation angle sensor having high precision output performance without increasing cost.

DISCLOSURE OF THE INVENTION

The rotation angle sensor of this invention comprises a pair of permanent magnets with their opposite poles facing each other, and a magnetic flux density detecting unit which performs relative rotation between the permanent magnets. The opposite magnetic pole surfaces of the pair of permanent magnets are formed in a curved shape.

In this invention, it is preferable that the opposite magnetic pole surfaces of the permanent magnets are hollowed out to form concave depressions. Alternatively, the opposite magnetic pole surfaces of the permanent magnets may bulge outwards to form convex surfaces.

In this invention, a pair of hall elements may be disposed on either side of the rotation centreline as the flux density detecting unit.

According to this invention, by forming the opposite magnetic pole surfaces of the permanent magnets in a curved shape, the flux density between the permanent magnets may be distributed in any way desired, there is no need to use costly materials for the permanent magnets, and the required high detection precision can be obtained.

According to this invention, the flux density between the permanent magnets can be made uniform and the sensor output resolution can be made constant without using costly materials for the permanent magnets.

According to this invention, the flux density between the permanent magnets can be concentrated in the vicinity of the magnet centreline, a high resolution area in which the sensor output varies sharply relative to displacement of the flux density detecting unit can be set, and the detection precision of the rotation angle sensor can be increased.

Further, according to this invention, the hall elements are not disposed on the rotation centreline, so a suitable distribution of flux density can be obtained and the output voltage from the hall elements can be extracted without error.

DESCRIPTION OF THE PREFERRED EMBODIMENTS

This invention will now be described in more detail referring to the appended drawings.

Figure 1:
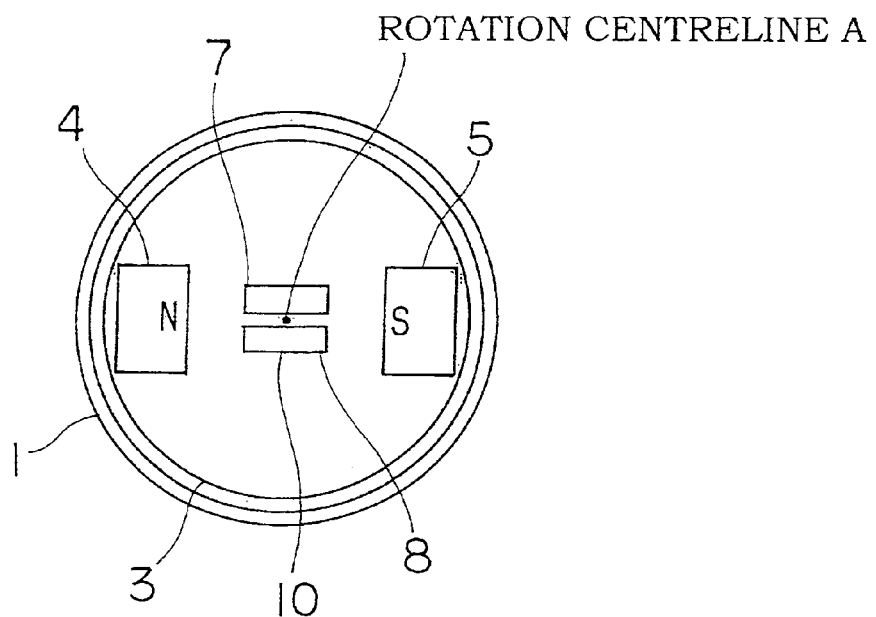
FIG. 1 is a plan view of a rotation angle sensor showing one embodiment of this invention.
Figure 2:
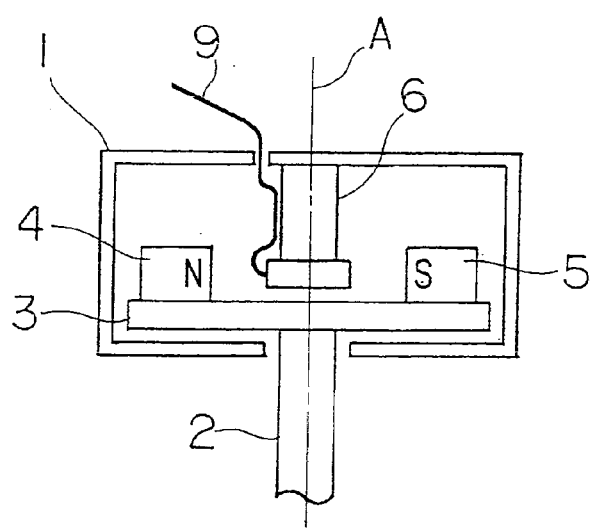
FIG. 2 is a side view of the rotation angle sensor.

First, FIG. 1, FIG. 2 show an example of a rotation angle sensor which can be applied to this invention.

This rotation angle sensor comprises a case 1 and a rotation shaft 2 which rotate relative to each other, and a pair of hall elements 7, 8 are fixed to a supporting member 6 attached to the case 1. A pair of permanent magnets 4, 5 are fixed to a rotor 3 attached to the rotation shaft 2. When the rotation shaft 2 rotates, the permanent magnets 4, 5 rotate together with the rotor 3.

The permanent magnets 4, 5 have their opposite poles facing each other on the rotor 3, and are disposed symmetrically about a rotation centreline A of the rotation shaft 2. The hall elements 7, 8 are also disposed symmetrically about the rotation centreline A, and are interposed between the permanent magnets 4, 5.

The hall elements 7, 8, which comprise the flux density detecting unit 10, output a voltage as an electrical signal via a wire 9 as the flux density varies according to the relative rotation of the permanent magnets 4, 5.

In this invention, magnetic pole surfaces 11, 12 of the permanent magnets 4, 5 are formed in a curved shape so that the flux density between the permanent magnets 4, 5 is suitably distributed.

Figure 3:
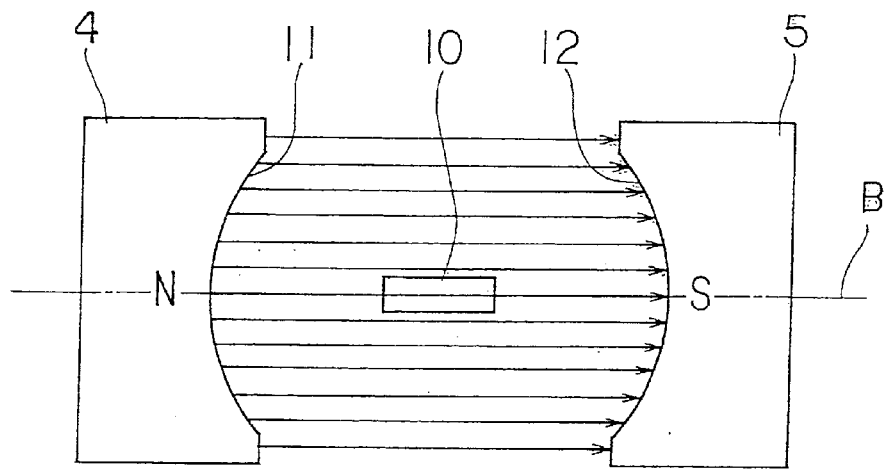
FIG. 3 is a plan view showing an enlargement of a permanent magnet.

FIG. 3 is a plan view of the permanent magnets 4, 5 seen from the rotation shaft direction. The opposite magnetic pole surfaces 11, 12 of the permanent magnets 4, 5 are formed in a hollow, curved shape in FIG. 3. As clearly shown in FIG. 3, the surfaces 11 and 12 curve around the rotation centerline with a shape curved in all planes normal to the rotation centerline and linear in all planes parallel to the rotation centerline. On the other hand, magnetic pole surfaces 13, 14 of the permanent magnets 4, 5 which are not facing each other are formed in a flat shape. Therefore, the cross-sectional surface area in the magnetic pole direction of the permanent magnets 4, 5 decreases towards the magnet centreline B. Hence, the curvature of the magnetic pole surfaces 11, 12 can be set arbitrarily, and the flux density between the permanent magnets 4, 5 can be made uniform.

Figure 4:
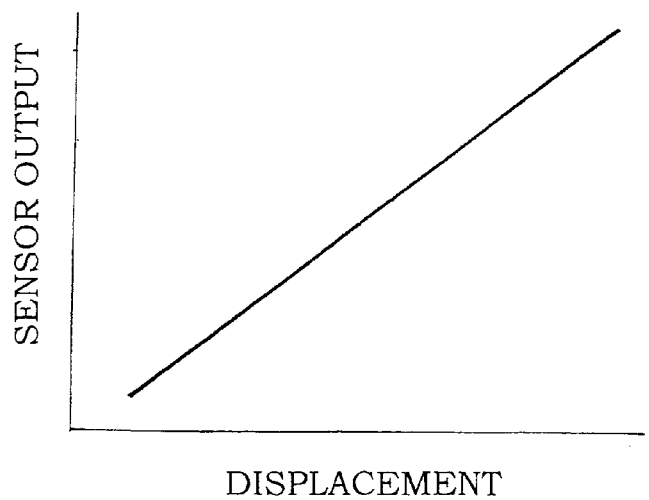
FIG. 4 is a graph showing output characteristics of the rotation angle sensor.
Figure 5:
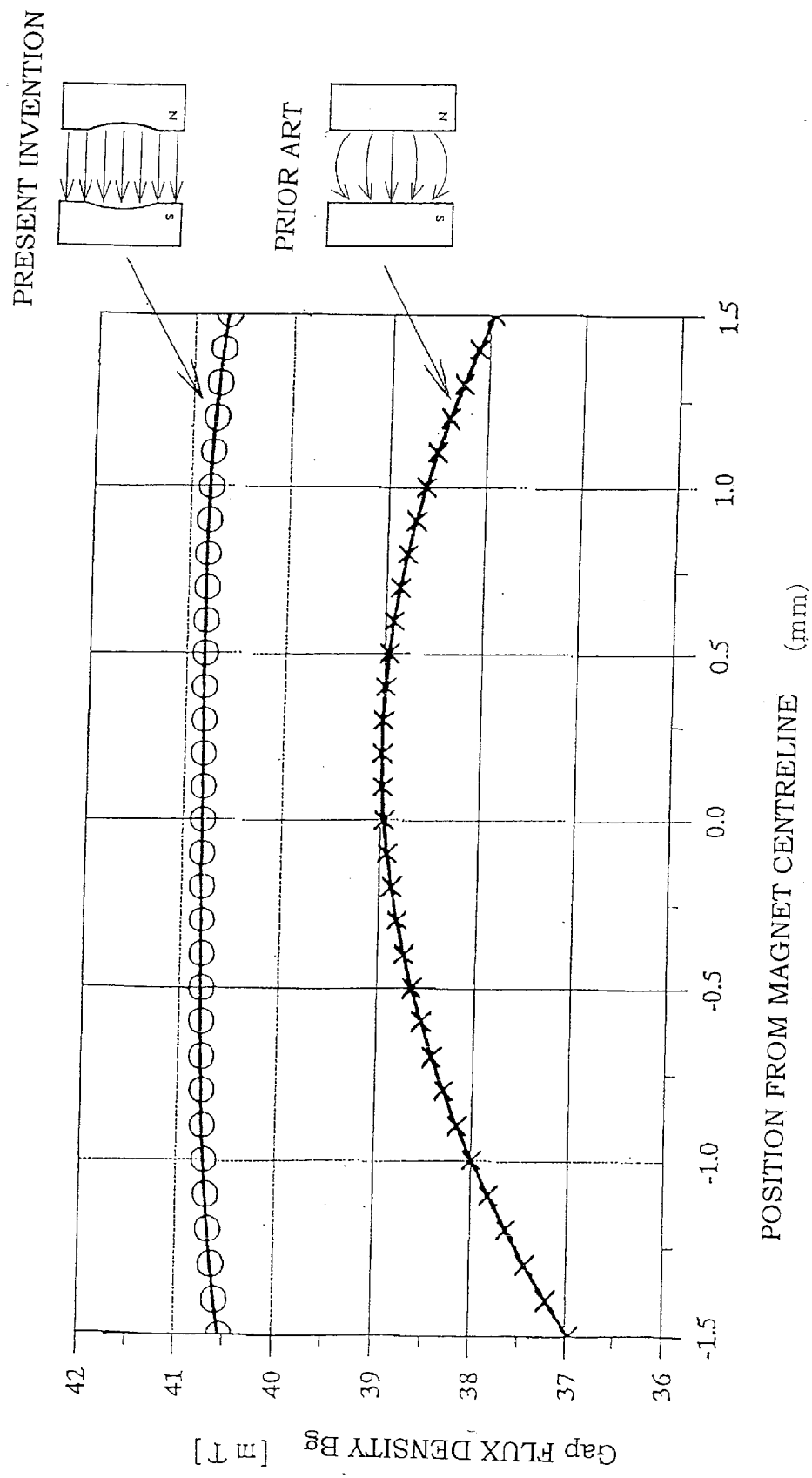
FIG. 5 is a descriptive diagram showing the distribution of flux density of the rotation angle sensor.

In the above construction, the distance between the magnetic pole surfaces 11, 12 formed as a hollow increases towards the magnet centreline B, so by suitably setting the curvature of the magnetic pole surfaces 11, 12, the flux density generated between the permanent magnets 4, 5 can be made uniform as shown in FIG. 5. In this way, by making the distribution of the flux density passing through the flux density detecting unit 10 uniform, the output variation of the flux density detecting unit 10 depends only on the variation amount of the flux input angle. The relation between the displacement amount (rotation angle) and sensor output is linear, as shown in FIG. 4, so the sensor output resolution can be made constant over a wide rotation angle range.

A uniform flux distribution can be obtained even if economical ferrite magnets are used. There is no need to use costly rare earth magnets, so the cost of the product can be reduced.

The hall elements 7, 8 are not disposed on the rotation centreline, so by suitably arranging the distribution of flux density passing through them, the output voltage from the hall elements 7, 8 can be extracted without error.

Figure 6:
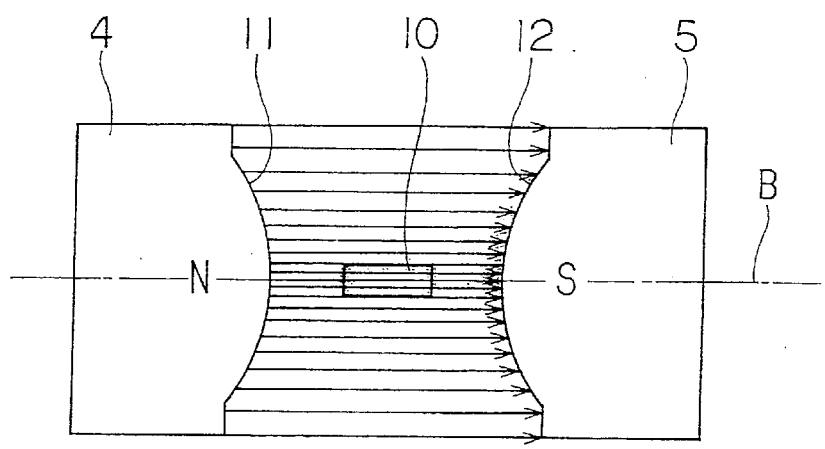
FIG. 6 is a plan view showing an enlargement of a permanent magnet in another embodiment of this invention.
Figure 7:
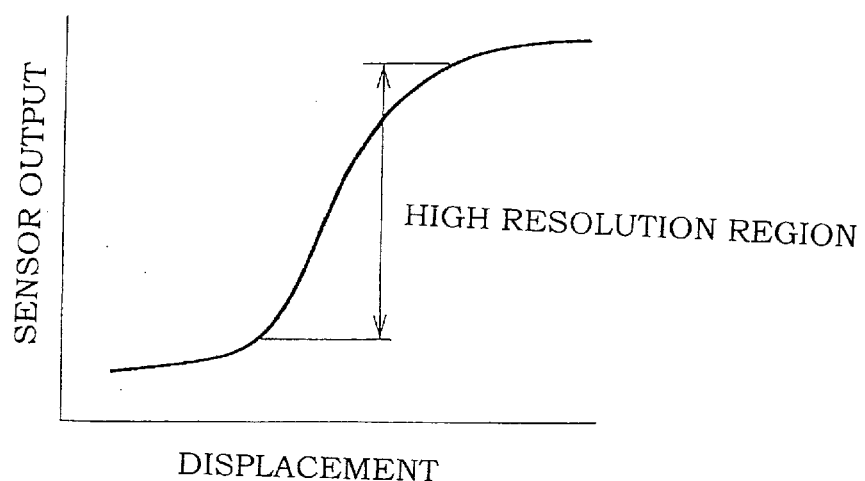
FIG. 7 is a graph showing output characteristics of the rotation angle sensor.
Figure 8:
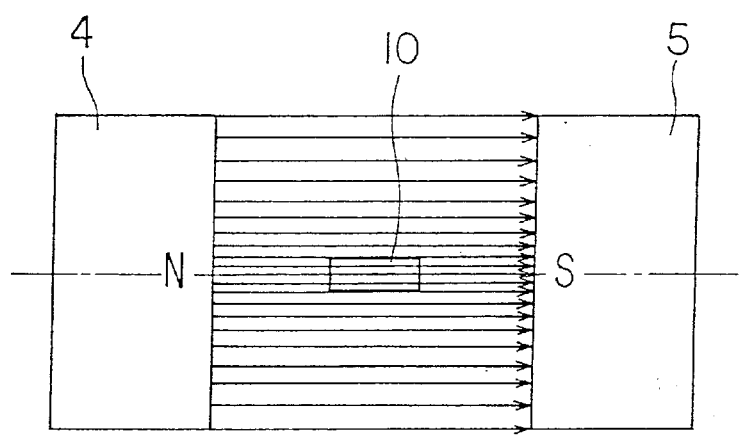
FIG. 8 is a plan view of a permanent magnet of a rotation angle sensor according to the prior art.
Figure 9:
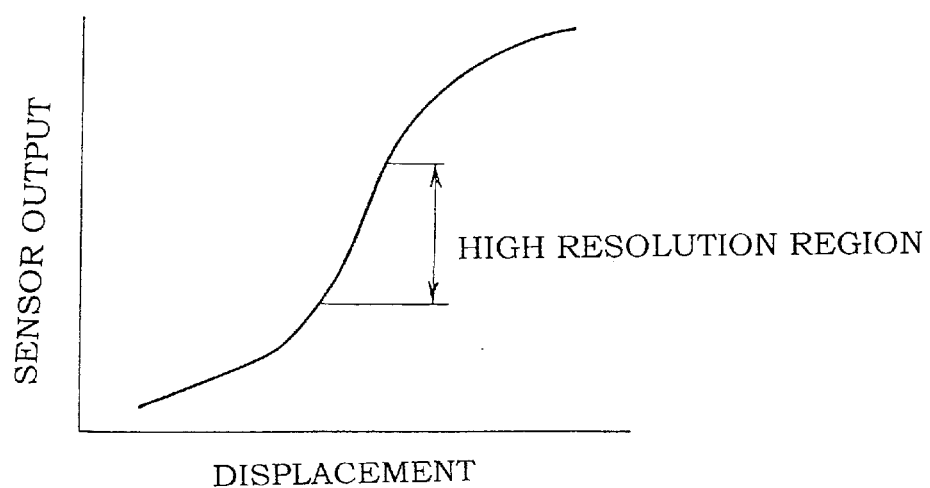
FIG. 9 is a graph showing the output characteristics of this sensor.

Next, in another embodiment shown in FIG. 6, the rotation angle sensor output characteristics are not linear over the whole range, and a higher resolution is obtained in part of the range.

The distance between the magnetic pole surfaces 11, 12 which bulge outwards in a convex shape decreases towards the magnet centreline B, so the flux density generated between the permanent magnets 4 increases towards the magnet centreline B. In this way, by concentrating the flux near the magnet centreline B, the high resolution region where the sensor output varies sharply relative to displacement of the flux density detecting unit 10 is enlarged. In this high resolution region, the sensor output resolution relative to displacement is increased.

Here, the magnetic pole surfaces 11, 12 of the permanent magnets 4, 5 are formed so that they bulge outwards in a convex shape. In this case, the cross-sectional surface area in the magnetic pole direction of the permanent magnets 4, 5 increases towards the magnet centreline B. Moreover, as clearly shown in FIG. 6, like in FIG. 3, the surfaces 11 and 12 curve in all planes normal to the rotation centerline and linear in all planes parallel to the rotation centerline.

The linear characteristics over the whole displacement range decrease, but as a larger output variation relative to displacement can be obtained in part of the range, a high resolution is obtained.

This invention is not limited to the above embodiments, it being understood that various modifications are possible within the scope and spirit of the appended claims.

INDUSTRIAL FIELD OF THE INVENTION

This rotation angle sensor is used for detecting a rotation angle, such as that of a rotation shaft, as an electrical signal.

What is claimed is:

1. A sensor for detecting a rotation angle about a rotation centerline as an electrical signal, comprising:
   a pair of permanent magnets having respective magnetic pole surfaces that face each other on opposite sides of the rotation centerline, magnetic poles at the respective facing magnetic pole surfaces being of opposite polarity,
   a flux density detecting unit, disposed between the permanent magnets, and
   means for providing rotation of the permanent magnets relative to the flux density detecting unit about the rotation centerline, wherein:
      magnetic pole surfaces of the magnets, not facing each other, are flat, and
      the facing magnetic pole surfaces of the permanent magnets are curved around the rotation centerline with a shape curved in all planes normal to the rotation centerline and linear in all planes parallel to the rotation centerline, such that the flux density generated between the permanent magnets is uniform.

2. The rotation angle sensor as defined in claim 1, wherein the opposite magnetic pole surfaces of the permanent magnets have a concave shape.

3. A sensor for detecting a rotation angle about a rotation centerline as an electrical signal, comprising:
   a pair of permanent magnets having respective magnetic pole surfaces that face each other on opposite sides of the rotation centerline, magnetic poles at the respective magnetic pole surfaces being of opposite polarity,
   a flux density detecting unit, disposed between the permanent magnets, and
   means for providing rotation of the permanent magnets relative to the flux density detecting unit about the rotation centerline, wherein magnetic pole surfaces of the permanent magnets not facing each other are flat, and wherein the opposite magnetic pole surfaces of the permanent magnets have a convex shape, curved in all planes normal to the rotation centerline and linear in all planes parallel to the rotation centerline, whereby the flux density generated between the permanent magnets is concentrated in a vicinity of a magnet centerline extending from one of the facing magnetic pole surfaces to the other.

4. The rotation angle sensor as defined in claim 1, wherein a pair of Hall elements functioning as the flux density detecting unit are disposed on either side of the rotation centerline.

5. The rotation angle sensor as defined in claim 3, wherein a pair of of Hall elements functioning as the flux density detecting unit are disposed on either side of the rotation centerline.

6. A sensor for detecting a rotation angle about a rotation centerline as an electrical signal, comprising:
   a pair of permanent magnets having respective magnetic pole surfaces that face each other on opposite side of the rotation centerline, magnetic poles at the respective facing magnetic pole surfaces being of opposite polarity,
   a flux density detecting unit, disposed between the permanent magnets, and
   means for providing rotation of the permanent magnets relative to the flux density detecting unit about the rotation centerline, wherein:
      magnetic pole surfaces of the magnets, not facing each other, are flat, and
      the facing magnetic pole surfaces of the permanent magnets have a curved shape in all planes normal to the rotation centerline and have a linear shape in all planes parallel to the rotation centerline.

7. The rotation angle sensor as defined in claim 6, wherein a pair of hall elements functioning as the flux density detecting unit are disposed on either side of the rotation centerline.

* * * * *